United States Patent [19] [11] 4,084,165
Skafvenstedt et al. [45] Apr. 11, 1978

[54] FLUID-JET WRITING SYSTEM

[75] Inventors: Bengt Skafvenstedt, Stockholm; Sture Ahlgren, Vaellingby; Eberhard Tschuertz, Jaerfaella, all of Sweden

[73] Assignee: Siemens Aktiengesellschaft, Berlin & Munich, Germany

[21] Appl. No.: 745,575

[22] Filed: Nov. 29, 1976

[30] Foreign Application Priority Data

Dec. 22, 1975 Germany ............................ 2557869

[51] Int. Cl.[2] ........................ G01D 15/18; F04B 49/06

[52] U.S. Cl. .................................. 346/140 R; 346/75; 417/44

[58] Field of Search ............. 346/75, 140 R; 401/145, 401/150; 417/36, 44

[56] References Cited

U.S. PATENT DOCUMENTS

| | | | |
|---|---|---|---|
| 2,891,625 | 6/1959 | Hube | 417/44 X |
| 3,341,860 | 9/1967 | Schweitzer | 346/140 R |
| 3,371,350 | 2/1968 | Sanderson et al. | 346/140 R |
| 3,708,798 | 1/1973 | Hildenbrand et al. | 346/140 R |
| 3,761,953 | 9/1973 | Helgeson et al. | 346/140 R X |
| 3,787,882 | 1/1974 | Fillmore et al. | 346/75 |
| 3,971,039 | 7/1976 | Takano et al. | 346/75 |
| 3,985,467 | 10/1976 | Lefferson | 417/44 X |

*Primary Examiner*—George H. Miller, Jr.
*Attorney, Agent, or Firm*—Hill, Gross, Simpson, Van Santen, Steadman, Chiara & Simpson

[57] ABSTRACT

A fluid-jet writing system in which writing fluid is pumped from a fluid container or reservoir to one or more fluid-jet writing nozzles. A valve is located in the hydraulic circuitry which connects the pump to the nozzles for controlling the flow of writing fluid to the nozzle. A comparator is also located in the hydraulic circuitry for maintaining a predetermined fluid pressure between the pump and the valve by controlling the operation of the pump.

5 Claims, 2 Drawing Figures

FLUID-JET WRITING SYSTEM

BACKGROUND OF THE INVENTION

This invention relates generally to fluid-jet writing systems and more particularly to those systems which utilize a mechanical pump for pumping writing fluid from a fluid container or reservoir to one or more printing or writing fluid-jet nozzles. Although a variety of writing fluids may be used in such systems, the term "ink" shall be used hereinafter for convenience in referring to all such writing fluids.

In general, writing devices of the type described have heretofore been constructed and arranged so that fluid pressure is developed within the system only when the fluid jet nozzles are actuated to produce printed material. Thus, during periods of inactivity, the fluid pressure is permitted to drop and only upon actuation of the system is the fluid pressure increased to operational levels. This is usually accomplished by means of a constant speed pump which can develop a fluid pressure and flow rate which do not necessarily correspond to the ink pressure and flow rate required at the nozzles. In order to control the fluid pressure a spring-loaded pressure control valve is generally employed on the downstream side of the pump.

The previously known systems described above have several deficiencies, one of which involves the reduction in ink pressure during periods of inactivity. As a consequence, once the system is actuated a time lag occurs between the moment of actuation and the moment that ink actually issues from the nozzles, at the appropriate pressure, to produce a clear recordation of the printed characters.

Furthermore, since air bubbles often enter the system during periods of inactivity, an ink splashing effect may intermittently occur at the nozzles for a period of time, thereby again causing unclear and unsatisfactory printing.

In addition, the spring-loaded pressure control valve cannot normally maintain the ink pressure at a predetermined value except within rather broad ranges. Thus the quality of the printing is also adversely affected by rather substantial variations in the pressure of the ink at the nozzles.

Objects of the present invention are to provide a fluid-jet writing system of the type generally described above, but which is improved in a manner whereby ink pressure is maintained even during periods of inactivity, and the pressure is always maintained with a high degree of exactness, whereby to effect a higher quality of writing and to avoid delays in printing upon actuation of the system.

SUMMARY OF THE INVENTION

The foregoing, and other objects of the invention, are attained by providing a pressure converter in the ink supply line and utilizing a signal produced by the converter in conjunction with a bridge type comparator circuit to control the operation of the pump for maintaining a predetermined fluid pressure in the system.

In addition, a valve arrangement is provided whereby the ink in the pressurized ink supply circuitry can be placed in communication with or blocked from the nozzles, or conducted back to the ink reservoir through a by-pass conduit.

As a consequence of the present invention the entire ink supply system is substantially filled with pressurized ink at all times, even during periods of inoperation, whereby upon actuation of the system, the printing or writing commences almost immediately and all of the printed characters, including the initial characters, are clear and precise.

In a preferred embodiment of the invention, the valve arrangement involves an electromagnetically actuated switch-over valve which, in one position thereof, conducts the ink from the pump back to the ink reservoir. This position obtains during periods of inoperation of the system, that is, when the system is not being used for its intended purpose in printing or writing. In another position of the switch-over valve, when the system is actuated to commence a printing or writing operation, the pressurized ink is directed from the pump to the ink-jet nozzles.

As a consequence of the switch-over valve, a supply of pressurized ink is available at the ink-jet nozzles almost immediately upon actuation of the nozzles, and upon termination of the printing process, pressure of the ink at the nozzles is almost immediately reduced. Thus the printed material is sharp and clear at the very beginning as well as at the very end of the printing process.

Many other features, advantages and additional objects of the present invention will become manifest to those skilled in the art upon making reference to the detailed description which follows and the accompanying sheets of drawings, in which a preferred structural embodiment incorporates the principles of the present invention is shown by way of illustrative example only.

DESCRIPTION OF THE PREFERRED EMBODIMENT

Figure 1:
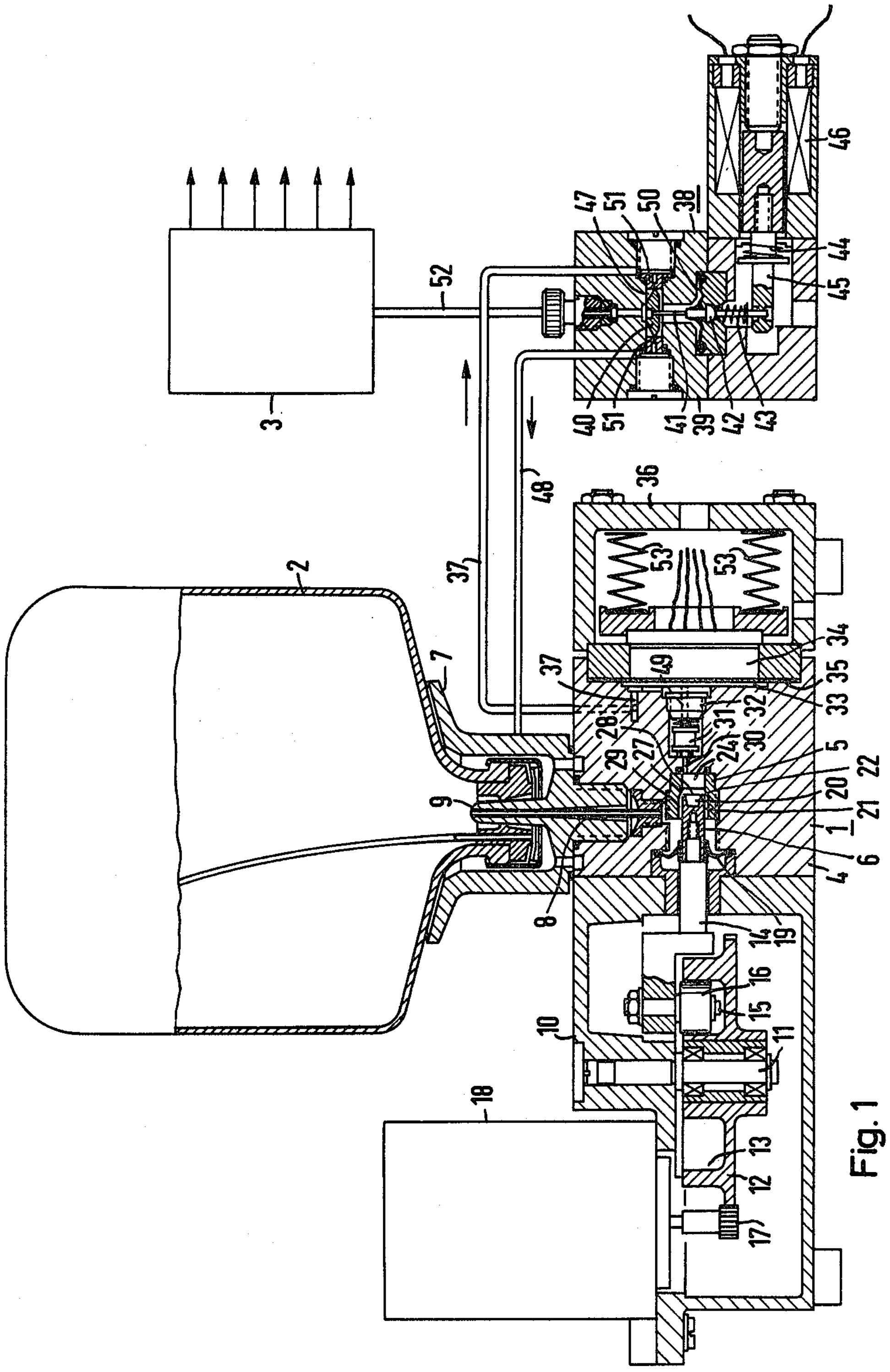
FIG. 1 is a sectional view of a fluid-jet writing system constructed in accordance with the principles of the present invention with portions thereof shown somewhat diagrammatically.

Referring to FIG. 1, the fluid-jet writing or printing system disclosed therein comprises a fluid or ink pump indicated generally at reference numeral 1 which performs the function of pumping ink from an ink reservoir 2 to a writing or printing device indicated generally at reference numeral 3. The device 3 may belong to any one of the variety of types including the type disclosed, for example, in U.S. Pat. No. 2,566,443.

The ink pump 1 includes a pump housing 4 on which is mounted a collar 7 for receiving and supporting the reservoir 2. A finger-like protuberance 9 resides within the collar 7 and is formed with a bore 8 which serves as a channel or conduit for transmitting ink from the reservoir 2 to the pump 1. Formed within the pump housing 4 is a cylinder 5 in which is disposed for reciprocal movement a plastic piston 6.

A driving system is provided for reciprocating the piston 6 and involves an electric motor 18 on the shaft of which is mounted a pinion gear 17 which meshes with a drive gear 12 mounted on a shaft 11 which is journalled for rotation on a gear housing 10.

Formed in the gear 12 is a cam groove or channel 13 in which is disposed a roller-type cam follower 16 mounted on a shaft 15 which is, in turn, connected to a piston rod 14 connected for joint movement with the piston 6.

A flexible membrane 19 is located in the cylinder 5 and has a centrally apertured portion connected fast to the piston 6 and a peripheral portion connected in fixed assembly to the pump housing 4. The membrane 6 performs a pumping function along with the piston 6 and in addition partitions a working portion 24 of the cylinder 5 from the piston driving end thereof.

A recess 20 is formed in the front wall 28 of the piston 6 to enable the forward end of the piston to resiliently deform radially inwardly during a pumping stroke of the piston as the front wall 28 moves into engagement with a tapered portion of the cylinder 5. The diameter of the circumferential wall 21 of the piston 6 is greater than the smallest diameter of the tapered portion of the cylinder 5 and thus as the piston 6 moves forward (in a rightward direction as viewed in FIG. 1) during a pumping stroke, the leading edge of the piston 6 engages the tapered portion of the cylinder 5 in good sealing relation.

As the piston 6 moves backward during a suction stroke a gap 27 is formed between the piston 6 and the wall of the cylinder 5 and a vacuum condition is produced in the cylinder 5, including portion 24 thereof. The ink from the reservoir 2 is thereby drawn into the cylinder 5, including portion 24 thereof into which the ink passes through the gap 27 formed between the piston wall 21 and the wall of the cylinder 5 indicated at reference numeral 29.

As the piston 6 moves forward during a pumping stroke the ink in cylinder portion 24 is pumped through a passage 30 and a spring-loaded check valve 31 and into a chamer 33 via a passage 49 formed in a screw mechanism 32 which positions the valve 31.

The pressurized ink in the chamber 33 on a spring-loaded pressure converter 34, the pressure converter 34 being separated from the chamber 33 by means of a flexible membrane 35. From the chamber 33 the pressurized ink passes through a conduit 37 to a switch-over valve indicated generally at reference numeral 38.

The function of the valve 38 is to alternatively block further passage of the pressurized ink in the conduit 37, or to direct the ink to the writing device 3 by way of a conduit 52, or to direct the ink through a by-pass conduit 48 back to the ink reservoir 2.

In the embodiment illustrated, the switch-over valve 38 comprises a housing 39 in which an electromagnetically actuatable switch member 40 is disposed. The switch or valve member 40 is connected to and mounted on a valve pin 41 which is tiltably movable by virtue of a ball member 42 and spring-biased by virtue of a spring member 43.

A lower end of the valve pin 41 is operatively connected to an elongated shaft 45 which is shiftable in an axial direction and which is biased by means of a spring 44 and movable by virtue of an electromagnet indicated at 46.

The valve member 40 is movable within a valve chamber 47 to several positions. In one position of the valve member 40, fluid communication between the supply conduit 37 and the chamber 47 is blocked, but communication is established between the conduit 52 and the by-pass or reverse-flow conduit 48. In another position of the valve member 47, fluid communication is established between the conduit 37 and the conduit 52, and communication is blocked between the conduit 52 and the conduit 48.

In the embodiment illustrated, fluid communication is established between th conduit 37 and the conduit 52 and the electromagnet 46 is energized, and communication is established between the conduit 52 and the conduit 48 when the electromagnet 46 is deenergized.

As illustrated, the lower portion of the chamber 47 is enclosed by means of a flexible membrane 50. A pair of valve seats are formed in the chamber 47 at the ports communicating the chamber 47 with the conduits 37 and 48. The ends or outer tips of the valve member 40 cooperate with the valve seats indicated at reference numerals 51 to perform a valving function, and such tips may preferably be made of sapphire or the like to reduce wear.

Since the conduit 37 is always filled with pressurized ink, actuation of the writing device 3 and energization of electromagnet 46 results in immediate printing. Upon deactuation of the writing device 3, the pressure of the ink in the conduit 52 is immediately reduced by virtue of the communication thereof with the conduit 48, and thus the printing immediately ceases, and a delay issuance of ink from the nozzles of the writing device 3 is avoided.

As noted, the pressure of the ink in the chamber 33 acts upon the pressure converter 34 which is resiliently biased by virtue of spring members 53 located within a housing member 36. As will be explained hereinafter in greater detail, the pressure converter 34 effectively controls the operation of the motor 18 whereby a given ink pressure is maintained in the chamber 33, and thus in the conduit 37, at all times. Thus, when the valve member 40 blocks communication between the conduit 37 and the conduit 52, the pressure converter 34 will, after the pressure builds up slightly in the chamber 33, effectively deactuate the motor 18. On the other hand, when the writing device 3 is again operated and fluid communication is established between the conduit 37 and the conduit 52, the corresponding reduction in pressure in the chamber 33 will have the effect of inducing the pressure converter 34 to again start the motor 18. Thus, by virtue of the pressure converter 34, the motor 18 is controlled in a manner to maintain a given ink pressure in the chamber 33 and the conduit 37. As a consequence clear printing or writing is produced immediately upon actuation of the writing device 3, and immediately ceases upon deactuation of the writing device.

Figure 2:
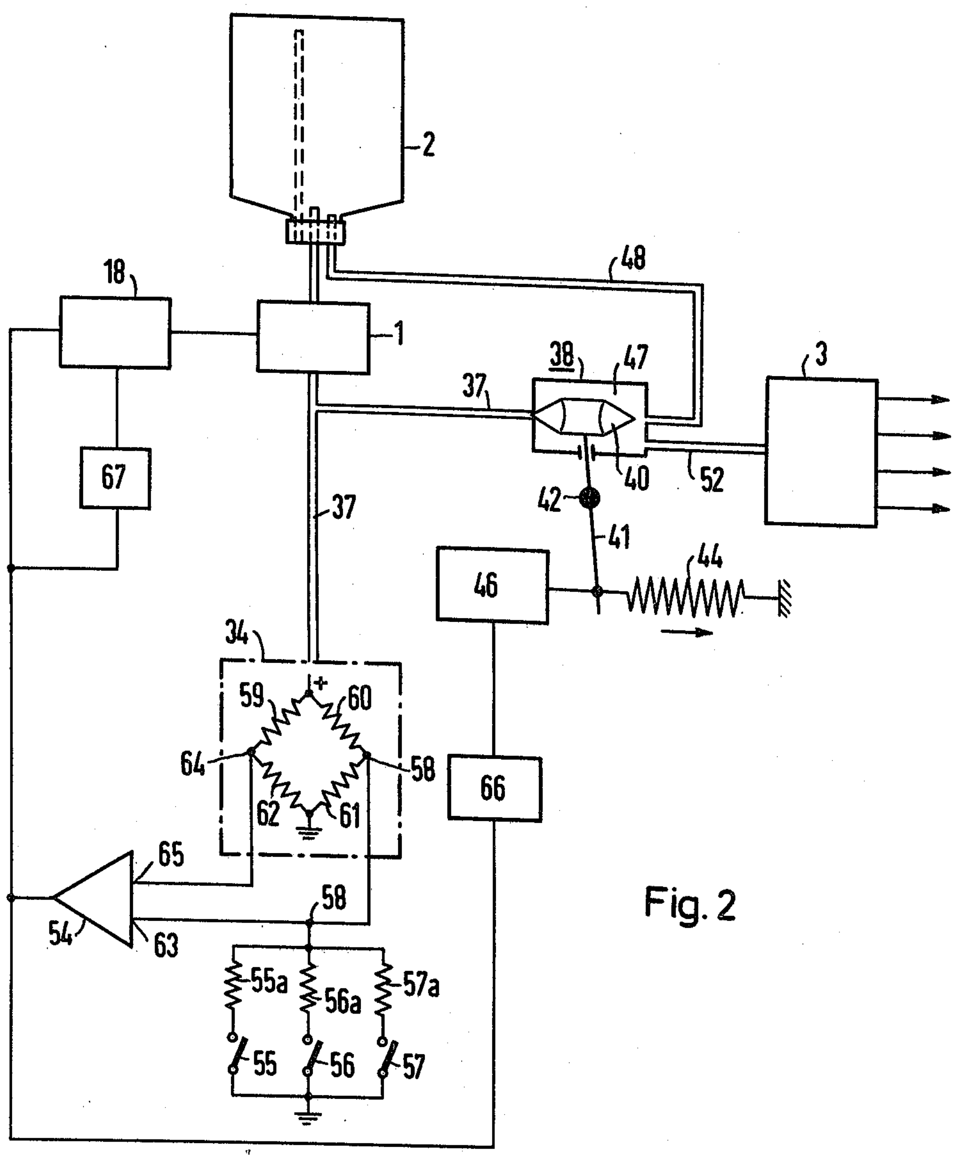
FIG. 2 is a schematic or diagrammatic illustration of the invention disclosed in FIG. 1.

This system of pressure control is illustrated diagrammatically in FIG. 2. Illustrated therein is a control loop or circuitry which includes the pressure converter 34, a differential amplifier 54 and the pump motor 18. A plurality of switches indicated at reference numerals 55, 56 and 57 are provided for selecting a predetermined ink pressure level, and are effective in connecting corresponding resistances $55_a$, $56_a$ and $57_a$ in parallel with a resistance 61 of the pressure converter 34. The resistance 61 as well as resistances 59, 60 and 62 of the pressure converter 34 form a pressure dependent resistance bridge, the diagonals 58 and 64 thereof being connected to a pair of contacts 63 and 65 of the differential amplifier 54. The resistance bridge is changed, depending upon the desired value of the fluid pressure, as a consequence of the deformation of the pressure converter 34, that is, the pressure to which the pressure converter 34 is subjected. At least one of the resistances 59, 60 and 62 is so constructed that its resistance value will vary with pressures exerted thereon by the diaphragm 35 and is thus responsive to the pressure of the fluid in the chamber 34.

With respect to the operation of the pressure converter 34, the resistance bridge 59, 60, 61 and 62 is balanced, when the conduit 37 is subjected to atmospheric pressure and switches 55, 56 and 57 are open, in a manner whereby the amplifier 54 produces a "zero" output signal, whereby the pump motor 18 is deenergized. Subsequently, by way of closing one of the switches 55, 56 or 57, the ink pressure value is switched to a parallel condition with respect to the resistance 61. The resistance bridge 59–62 is therefore no longer in balance, and a signal is produced at the output of the amplifier 54 which energizes the motor 18. The pump motor 18 is now actuated and runs until the ink pressure in the line 37 is equal to the pre-selected desired pressure level. When this occurs, the resistance bridge 59–62, which also includes one of the resistances $55_a$–$57_a$, is balanced again, and the output signal of the amplifier 54 is reduced to zero, so that the pump motor 18 is again deenergized. Upon a subsequent actuation of the writing device 3, the amplifier 54 will again serve to actuate the pump motor 18 when the ink pressure in the line 37 varies from the selected desired pressure level.

A control member 67 is connected to the output of the amplifier 54, affecting the pump motor 18. The control member 67 controls the output signal of the amplifier 54 and determines whether this output signal exceeds a predetermined level. This level is exceeded when abnormal fluid pressure fluctuations occur in the ink hydraulic circuitry, for example, when a leak occurs in the system or when the reservoir 2 is empty. In such circumstances, the control member 67 serves to deenergize the pump motor 18.

The switch-over valve 38 may also cause a quick pressure drop to occur. This may occur by virtue of the provision of an impulse generator 66 which is connected to the electromagnet 46 as well as to the output of the differential amplifier 54. The impulse generator 66, when it is switched on, causes a periodic switching-over of the switch-over valve 40, and consequently a rapid reduction in the pressure of the hydraulic circuitry. The impulse generator 66 therefore is operable to actuate the motor 18 when the differential between the actual pressure of the ink in the hydraulic circuitry and the preselected desired pressure level exceeds a predetermined value.

Although minor modifications might be suggested by those versed in the art, it should be understood that we wish to embody within the scope of the patent warranted hereon all such modifications as reasonably come within the scope of our contribution to the art.

We claim:

1. A fluid-jet writing system comprising a fluid reservoir, a writing nozzle, conduit means interconnecting said reservoir and said nozzle, fluid pump means in said conduit means for pumping fluid from said reservoir to said nozzle, fluid pressure responsive means in said conduit means for sensing the pressure of the fluid between said pump means and said nozzle, for comparing that pressure with a given pressure and for producing a signal which varies in response to variations in the pressure differential, pump control means operatively interconnecting said pump means and said pressure responsive means, said pump control means being responsive to said signal for varying the operation of said pump means in accordance therewith, and switch-over valve means located in said conduit means between said pump means and said nozzle and comprising an electromagnetically actuatable switch-over valve member movable from a first position, at which the pressurized fluid from said pump means is directed to said nozzle, to a second position, at which the fluid at said nozzle is directed back to said reservoir.

2. The system as defined in claim 1 and including an impulse generator operatively connected to the switch-over valve member and responsive to the difference between the actual and desired pressures of the fluid to accomplish periodic switching-over of said valve member.

3. The system as defined in claim 1 wherein said pump control means further comprises control member means for deenergizing said fluid pump means in response to variations between the actual and desired pressure levels of fluid in said conduit means.

4. The system as defined in claim 1 wherein said fluid pressure responsive means comprises a spring-biased pressure converter disposed in open communication with the fluid in said conduit means.

5. The system as defined in claim 4 wherein said pressure converter comprises a flexible membrane forming part of said conduit means.

* * * * *